US009301618B2

(12) United States Patent
Leonhard (10) Patent No.: US 9,301,618 B2
(45) Date of Patent: Apr. 5, 2016

(54) EXERCISE DEVICE, CONNECTOR AND METHODS OF USE THEREOF

(71) Applicant: Christoph Leonhard, New Orleans, LA (US)

(72) Inventor: Christoph Leonhard, New Orleans, LA (US)

(*) Notice: Subject to any disclaimer, the term of this patent is extended or adjusted under 35 U.S.C. 154(b) by 260 days.

(21) Appl. No.: 13/837,324

(22) Filed: Mar. 15, 2013

(65) Prior Publication Data

US 2014/0274622 A1    Sep. 18, 2014

(51) Int. Cl.
*A63B 26/00* (2006.01)
*A47C 9/00* (2006.01)
*A47C 7/00* (2006.01)
*A47C 7/62* (2006.01)
*F16B 45/00* (2006.01)

(52) U.S. Cl.
CPC ............... *A47C 9/002* (2013.01); *A47C 7/004* (2013.01); *A47C 7/006* (2013.01); *A47C 7/62* (2013.01); *F16B 45/00* (2013.01); *Y10T 29/49286* (2015.01); *Y10T 403/70* (2015.01)

(58) Field of Classification Search
CPC .......... A47C 9/002; A47C 7/62; A47C 7/006; A47C 7/004; A47C 9/005; F16B 45/00; Y10T 403/70; A63B 17/00; A63B 17/04; A63B 21/14; A63B 21/1453; A63B 21/1457; A63B 21/1465; A63B 21/1496; A63B 14/16; A63B 2021/1609; A63B 22/0046; A63B 22/0048; A63B 22/0056; A63B 22/06; A63B 22/0605; A63B 22/0694; A63B 22/08; A63B 2022/0635; A63B 2022/0652; A63B 23/04; A63B 23/0405; A63B 23/0423; A63B 23/0476; A63B 69/16; A63B 2069/164; A63B 2208/0228; A63B 2208/0233; A63B 2210/00; A63B 2210/02; A63B 2210/50
USPC ............................................ 297/463.1, 463.2
See application file for complete search history.

(56) References Cited

U.S. PATENT DOCUMENTS

| 4,222,376 | A | * | 9/1980 | Praprotnik ........... A61H 1/0214 482/60 |
| 4,390,177 | A | * | 6/1983 | Biran ................. A63B 21/1609 188/83 |
| 5,308,302 | A | * | 5/1994 | Miller .............. A63B 23/03575 482/60 |
| 5,647,822 | A | * | 7/1997 | Avganim ........... A63B 22/0007 482/57 |
| 5,807,212 | A | * | 9/1998 | Nelson ..................... A47C 7/62 482/60 |
| 8,512,210 | B2 | * | 8/2013 | Shauli ............... 482/8 |
| 8,920,292 | B1 | * | 12/2014 | Myers et al. .................... 482/57 |
| 2004/0142797 | A1 | * | 7/2004 | Andre ................ A63B 22/0694 482/57 |
| 2006/0258520 | A1 | * | 11/2006 | Bowser ............. A63B 21/1672 482/121 |
| 2009/0088300 | A1 | * | 4/2009 | Catanescu ........... A61H 1/0214 482/51 |
| 2010/0285924 | A1 | * | 11/2010 | Shauli .............. 482/8 |
| 2014/0287883 | A1 | * | 9/2014 | Decca ............... A63B 22/0694 482/57 |

OTHER PUBLICATIONS

Shauli, Misha "How to mount Health Guard" http://youtu.be/5nGolmjHqhc (2:31) Nov. 27, 2013.

* cited by examiner

*Primary Examiner* — Oren Ginsberg
*Assistant Examiner* — Megan Anderson (57) ABSTRACT

A connector for coupling an exercise device to a five-leg chair includes a plate having a wheel hole, and an exercise device coupler. The coupler may include a plurality of wheel holes. The exercise device coupler may include pin slots.

8 Claims, 9 Drawing Sheets

EXERCISE DEVICE, CONNECTOR AND METHODS OF USE THEREOF

BACKGROUND

Automation and technological convenience have transformed previously active and ambulatory persons across the globe into increasingly sedentary beings. This trend is particularly prevalent in the workplace, where employees are often required to spend up to 8 hours a day seated at a desk, with their only substantial physical activity consisting of an occasional trip to the water cooler. When coupled with a diet of high calorie soft drinks and energy-dense, processed foods, increasingly sedentary lifestyles have led to an obesity epidemic, particularly in countries such as the United States. Many have proposed methods and devices to increase physical activity in the workplace. Few, however, have seen widespread adoption or commercial success.

Exercise devices which incorporate both a desk and a chair have been developed for integration into the office workplace. Such devices allow for both work and exercise at the workplace without having to leave the office or move furniture every time it is desired to exercise. However, adoption of such exercise devices into an existing workplace requires a substantial capital expenditure, because the exercise device will replace an existing desk and an existing chair.

In order to reduce the capital expenditure, it would be desirable to have an exercise device which could be integrated with a typical desk and a typical modern office chair. A typical desk is about 30 inches high, allowing space for a person to sit in a chair at the desk and have sufficient room for the person's legs under the desk. A typical modern office chair has a central stand for supporting the chair seat, and five legs extending from the central stand, with each leg ending in a wheel; this allows the chair to be rolled to and from the desk, and easily moved into a comfortable position to work at the desk or leave the desk.

U.S. Pat. No. 5,807,212 to Nelson describes a platform with indentations and a barrier bar for a chair, as well as a cross bar and sleeve system for a chair; the sole chair illustrated is a non-wheeled four-leg chair. U.S. Pat. No. 5,833,575 to Holslag describes a foot exerciser to be used in conjunction with a separate chair; the foot exerciser includes a plate onto which the feet of a chair are to be placed. U.S. Pat. No. 6,036,623 to Mitchell describes an exerciser which includes a U-shaped ramp, onto which a wheelchair may be placed. Patent Application Publication, Pub. No. US 2002/0098960 to Rusinak-Connors describes a retractable securing element, such as a fabric loop/hook fastener, for securing a chair to an under-desk device. Patent Application Publication, Pub. No. US 2004/0142797 to Andre describes a rigid connection clamp, which clamps to the central shaft of a five-leg chair. U.S. Pat. No. 6,840,892 to Wu describes an exercise machine for use with a wheelchair that includes a metal platform that the wheelchair could roll onto.

SUMMARY

In a first aspect, the present invention is a connector for coupling an exercise device to a five-leg chair, comprising a plate having a wheel hole, and an exercise device coupler.

In a second aspect, the present invention is a connector for coupling an exercise device to a five-leg chair, comprising a plate having means for coupling a five-leg chair to the connector, and an exercise device coupler.

In a third aspect, the present invention is a system for exercising while performing office work, comprising a five-leg chair having wheels, an exercise device coupled to the five-leg chair, and means for coupling the exercise device to a five-leg chair.

In a fourth aspect, the present invention is a method of coupling a five-leg chair having a wheel, and an exercise device, comprising placing the wheel of the five-leg chair into a wheel hole of a connector, and coupling the exercise device to an exercise device coupler of the connector.

In a fifth aspect, the present invention is a method of exercising on an exercise device, comprising coupling a five-leg chair having a wheel, and the exercise device, and exercising on the exercise device while sitting on the five-leg chair.

DETAILED DESCRIPTION

If a five-leg chair, which has wheels on all five legs, is used with a separate exercise device, the user will be propelled away from the exercise device due to the force exerted by the user's legs on the exercise device. Requiring the user to employ their hands on handles to prevent being propelled away is undesirable, as this will prevent the user from carrying out any work, such as writing, answering a telephone, or using a computer, during exercise. A wire, bar or other physical attachment, which directly connects the chair with the exercise device, and which fixes the relative position of the chair and exercise device is cumbersome to use, as it requires the user to climb under the desk in order connect or disconnect the chair from the exercise device. Furthermore, if all the legs of a chair are not resting on the same flat surface, the chair may be unstable and rock during exercise.

The present invention makes use of a connector, for connecting a five-leg office chair with an under-desk exercise machine. The connector takes advantage of a hole in a plate, which catches one of the five wheels of the five-leg chair. The low profile of the plate allows the user to wheel the chair over the plate so that wheel is caught within a hole. By simply exerting a slightly greater force with the user's legs, away from the exercise machine, the user may disengage the chair from the connector. This eliminates the need for the user to climb under the desk in order connect or disconnect the chair from the exercise machine. Preferably, when used with an under-desk elliptical exercise device, the user may conveniently perform office work while simultaneously exercising. The connector also provides the advantage that all five wheels of the five-leg chair are on the same surface, such as a floor or carpet, so that the five-leg chair is level and will not rock during exercise.

Figure 1A:
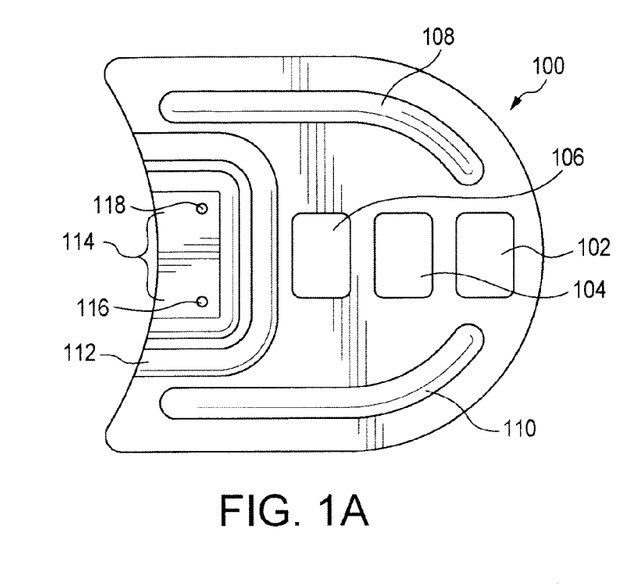
FIG. 1A, FIG. 1B, FIG. 2A, FIG. 2B, FIG. 3A, FIG. 3B, FIG. 9A and FIG. 9B illustrate four different connectors, for connecting a five-leg chair and an under-desk exercise device.
Figure 1B:
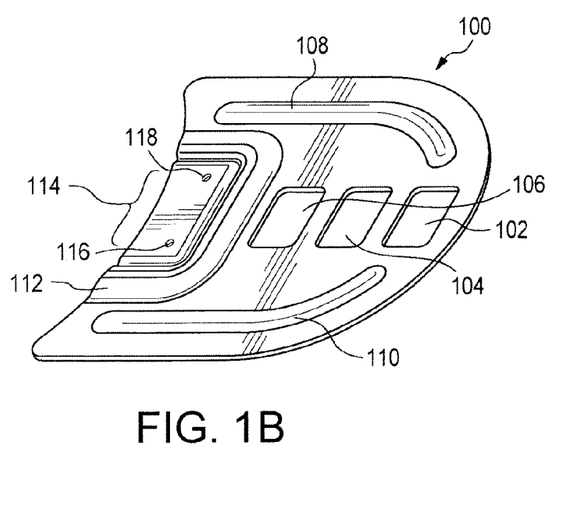

FIGS. 1A and 1B illustrate a connector, 100, for connecting a five-leg chair and an exercise device; FIG. 1A is a top view, and FIG. 1B is a perspective view. The connector includes three wheel holes, 102, 104 and 106, for coupling a wheel of a five-leg chair to the connector. In this connector, the wheel holes are square in shape, with rounded corners; other shapes, such a circular, oval or rectangular are also possible. Furthermore, the number of holes may vary, for example 2, 3, 4 or 5 holes, providing adjustability in the distance between the chair and the exercise device to accommodate different users.

Also illustrated in FIGS. 1A and 1B is exercise device coupler, 114, for coupling an exercise device to the connector. This exercise device coupler includes two pin slots, 116 and 118, for receiving pins present on an exercise device (not illustrated). Preferably, the pin slots are raised so that the pins may fully engage the pin slots. If the pin slots are round, preferably there are at least two pin slots, for example 2, 3, 4 or 5 pin slots. If the pin slots are not round, for example oval, square, rectangular or star-shaped, then one or more pin slots may be present, for example 1, 2, 3, 4 or 5 pin slots. Alternatively, the exercise device coupler may be bolt holes, for bolting the connector to the exercise device. In another alternative, the connector may be welded to the exercise device, so that the exercise device coupler is a weld, or it is integrated into the exercise device itself.

FIGS. 1A and 1B also illustrate optional elements of the connector, such as side structural supports, 110 and 108, and end structural support, 112. If the connector is formed of a plastic, the structural supports may be raised areas, providing addition support. Alternatively, the structural supports may be metal embedded into the plastic. The connector may be made from wood, plastic, metal, or composite materials. Preferably, the bottom may be composed of a rubber which will adhere to a floor or carpet and prevent sliding of the connector. Alternatively, the bottom may included many small teeth, for gripping a carpet to prevent sliding of the connector.

As illustrated in FIG. 1B, the bottom of the connector, which rests on the ground or on a carpet, has not protrusions, so that it may rest flat and level. The top of the connector, opposite the bottom, may include raised portions. Preferably, the total height of the connector, from the bottom to the top of any raised portions on the top of the connector, is at most 3 inches, more preferably at most 2 inches, and most preferably at most 1 inch. Preferably, the thickness of the connector, which is the thickness at the edge of the wheel holes, is at most 1 inch, more preferably at most 0.5 inches, most preferably at most 0.25 inches. This allows for easy engagement and disengagement of the chair wheel from the wheel hole. Preferably, the length of the connector, which is the distance from the center of the farthest wheel hole to the exercise device coupler, is at most 45 inches, more preferably at most 35 inches, including 10 to 30 inches.

Figure 2A:
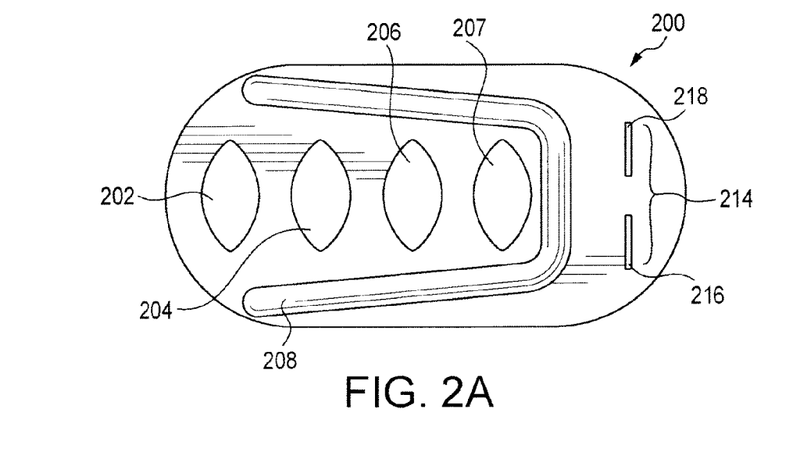
Figure 2B:
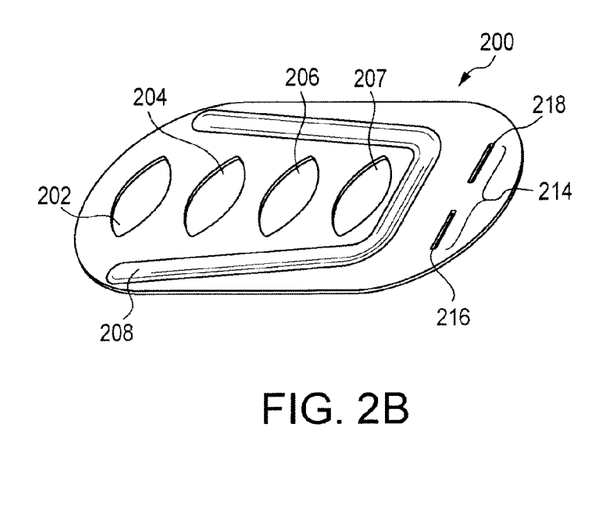

FIGS. 2A and 2B illustrate another connector, 200, for connecting a five-leg chair and an exercise device; FIG. 2A is a top view, and FIG. 2B is a perspective view. The connector includes four wheel holes, 202, 204, 206 and 207, for coupling a wheel of a five-leg chair to the connector. In this connector, the wheel holes have a pinched oval shape. Also illustrated is exercise device coupler, 214, for coupling an exercise device to the connector. This exercise device coupler includes two pin slots, 216 and 218, which are rectangular in shape, for receiving pins present on an exercise device (not illustrated). Also illustrated is optional wheel guide, 208, which may be a raised portion for guiding a wheel of a five-leg chair into a wheel hole.

Figures 3A, 3B:
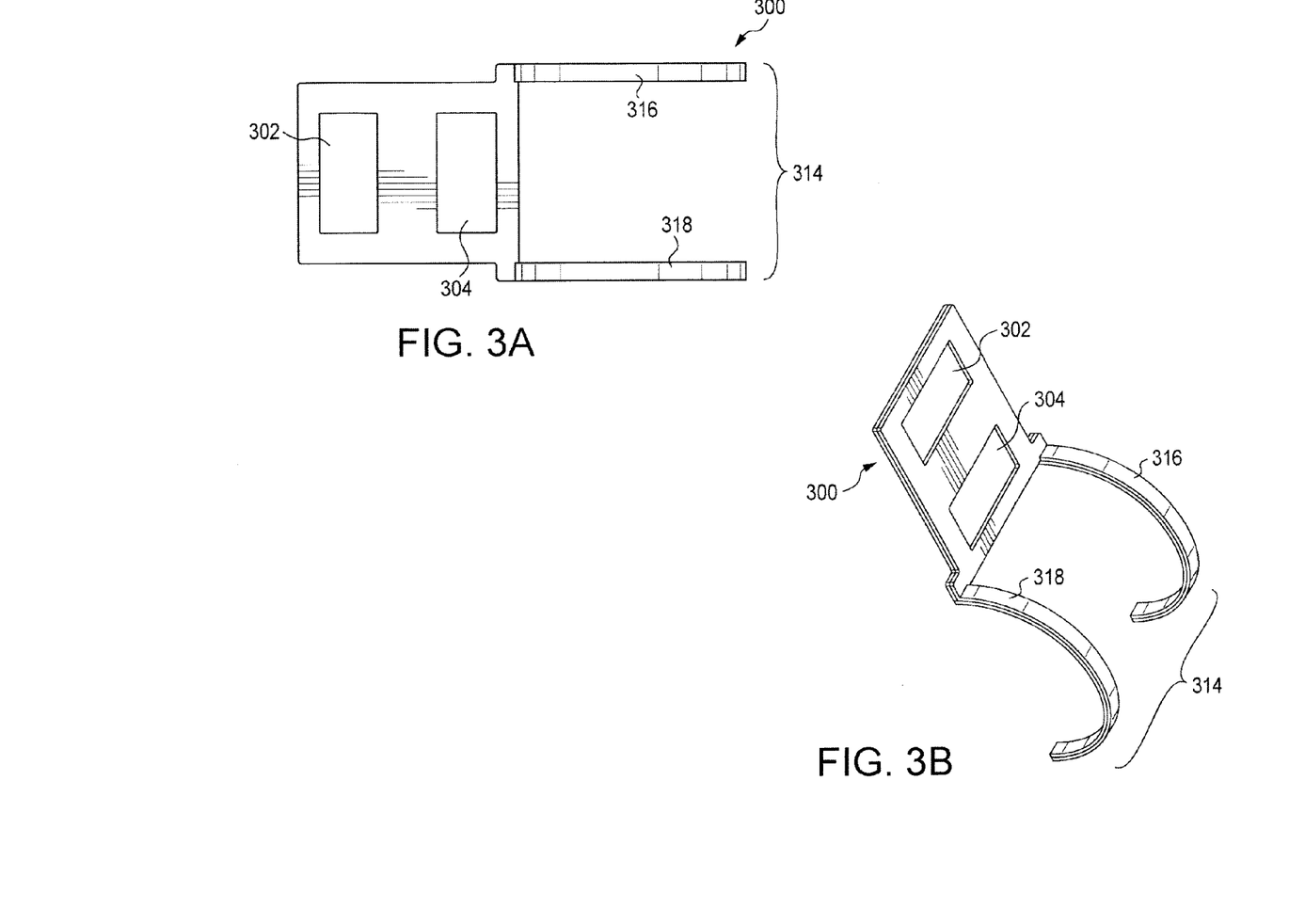

FIGS. 3A and 3B illustrate another connector, 300, for connecting a five-leg chair and an exercise device; FIG. 3A is a top view, and FIG. 3B is a perspective view. The connector includes two wheel holes, 302 and 304, for coupling a wheel of a five-leg chair to the connector. In this connector, the wheel holes are rectangular in shape. Also illustrated is exercise device coupler, 314, for coupling an exercise device to the connector. This exercise device coupler includes two hooks, 316 and 318, for hooking over a cross bar present on an exercise device (not illustrated).

Figure 4:
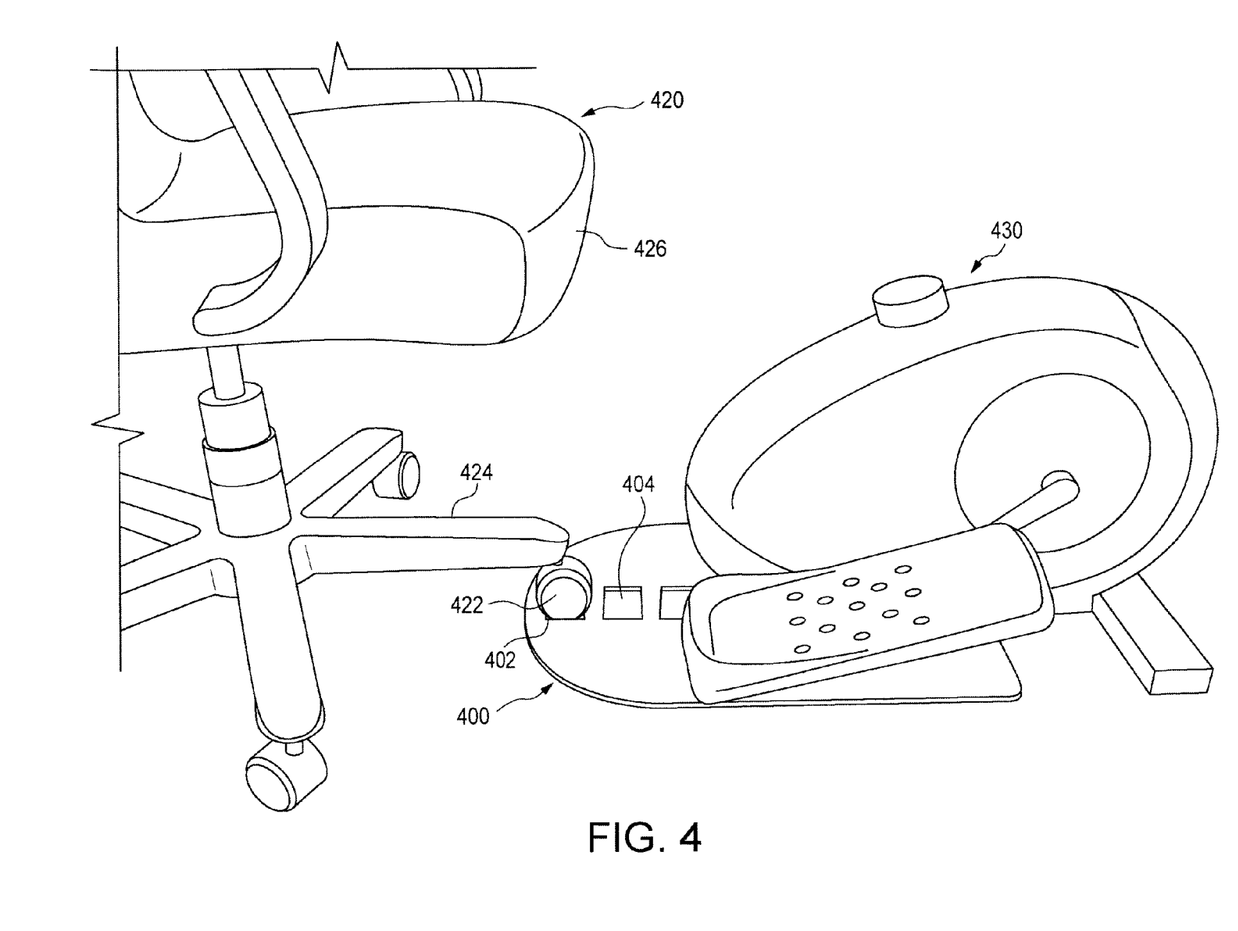
FIG. 4 illustrates a five-leg chair connected to an under-desk exercise device, via a connector.

FIG. 4 illustrates a connector, 400, coupled to a five-leg chair, 420, and coupled to an exercise device, 430. The five-leg chair includes a seat, 426, a leg, 424, and a wheel, 422. The connector includes wheel holes, 402 and 404. The wheel is in a wheel hole, preventing the chair from moving away from the exercise machine when a user is sitting in the chair and exercising.

Figure 5:
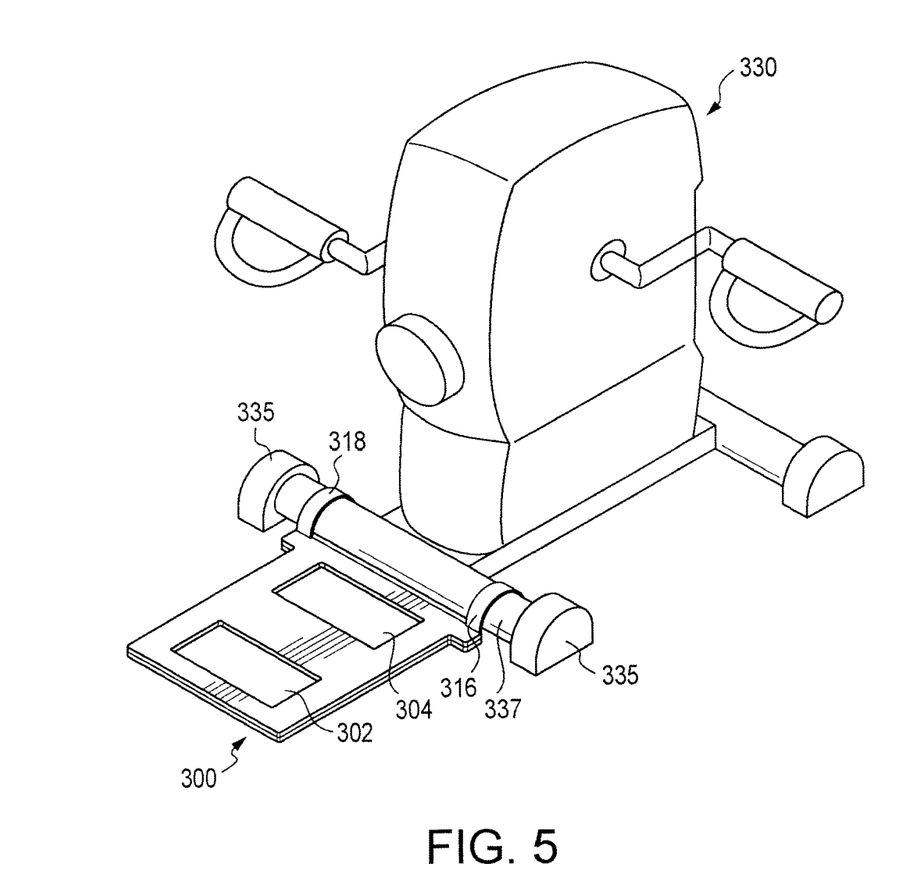
FIG. 5 illustrates an under-desk exercise device coupled with a connector.

FIG. 5 illustrates the connector, 300, shown in FIGS. 3A and 3B, coupled to an under-desk exercise device, 330. The exercise device includes first and second feet, 335 and 335, separated by a cross support, 337, which is attached to the exercise device. The connector is coupled through hooks, 316 and 318, which hook over the cross support, to the exercise device.

Figure 6:
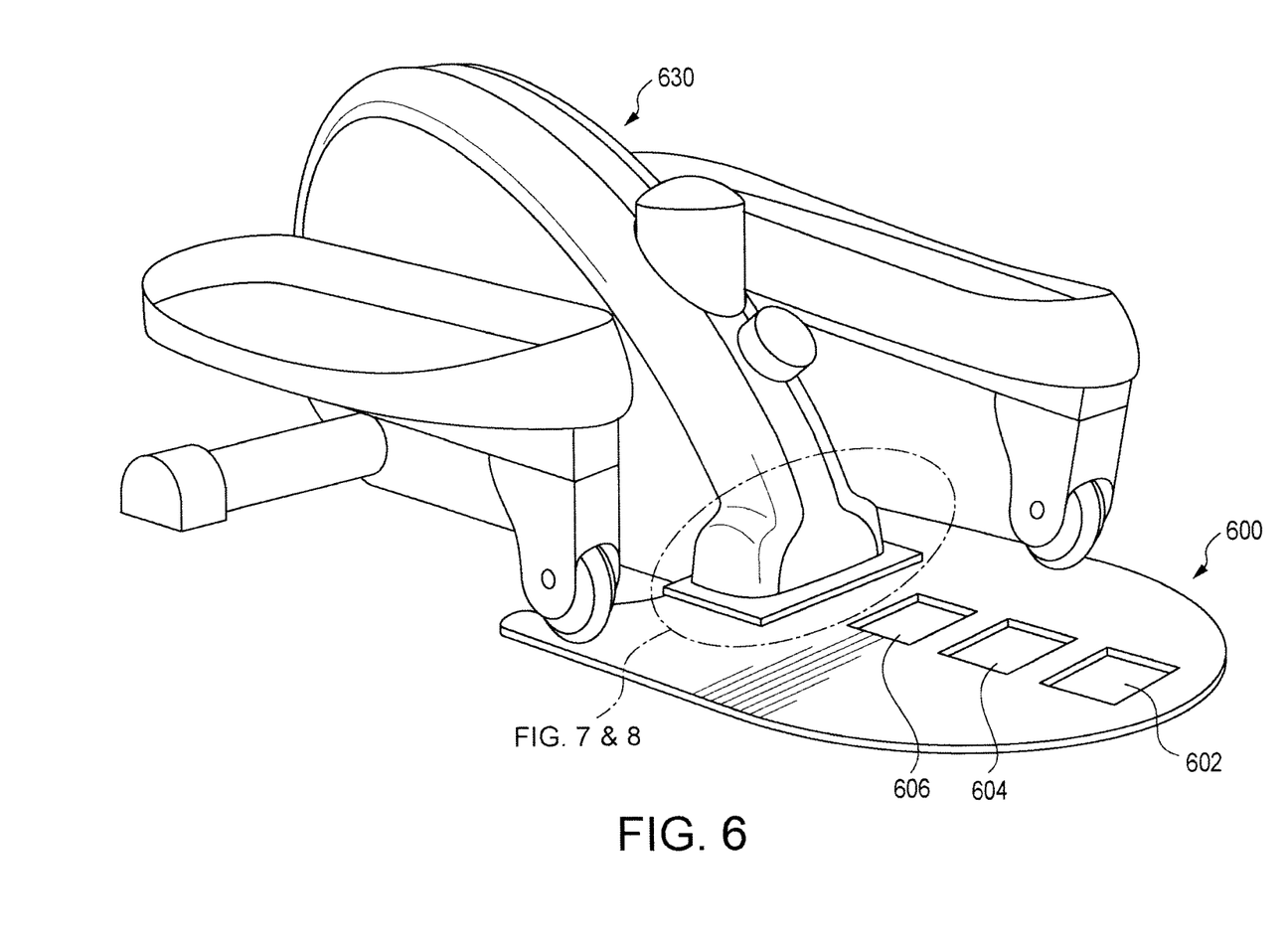
FIG. 6 illustrates a different under-desk exercise device coupled with a different connector.

FIG. 6 illustrates a connector, 600, coupled to an exercise device, 630. The connector includes wheel holes, 602, 604 and 606. The details of the coupling of the exercise device to the connector are illustrated in FIGS. 7 and 8.

Figure 7:
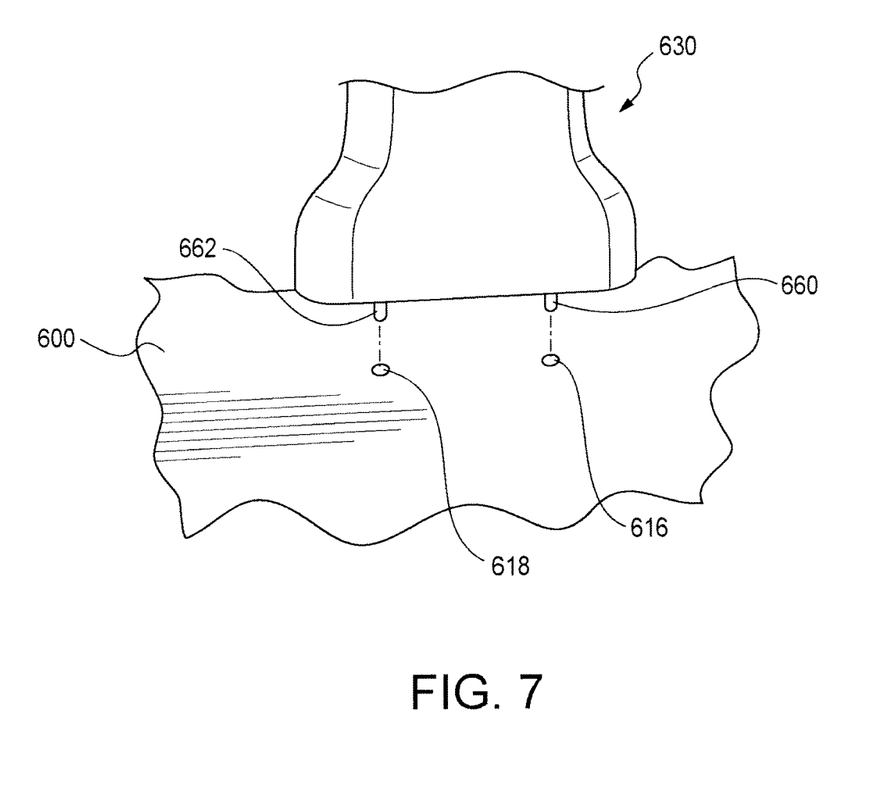
FIGS. 7 and 8 illustrate details of two different connector configurations, for coupling an under-desk exercise device and a connector.
Figure 8:
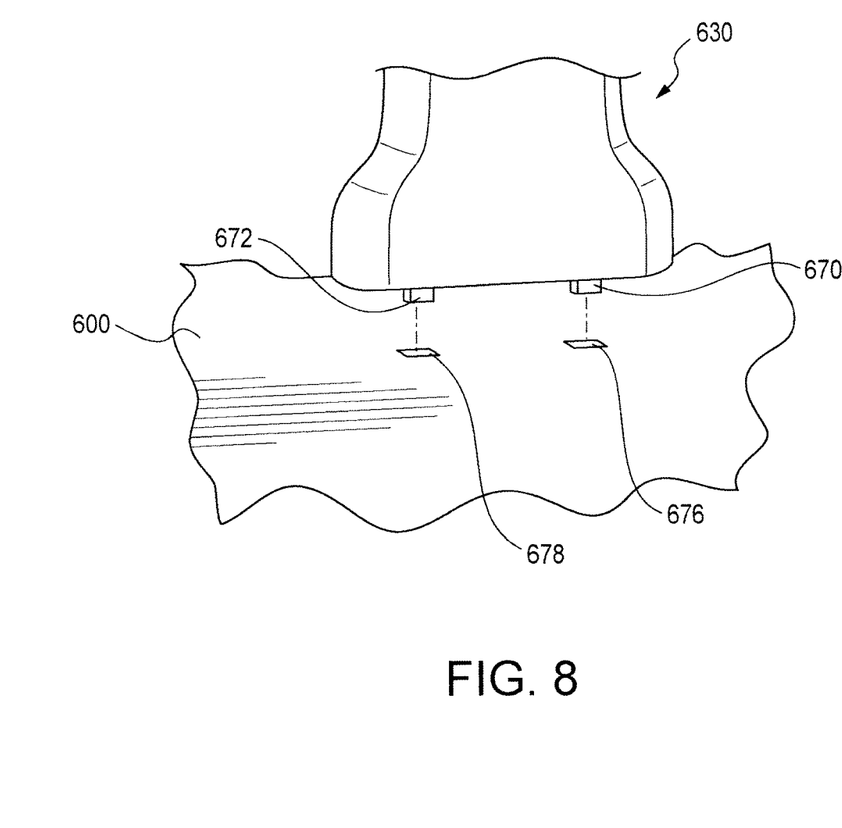

FIGS. 7 and 8 illustrate two alternative cut-away exploded views of the coupling of the exercise device, 630, and the connector, 600. In FIG. 7, the exercise device includes two pins, 660 and 662, which are both round. The connector includes two corresponding round pin slots, 616 and 618. The pins fit into the pin slots, to couple the exercise device to the connector. Similarly, in FIG. 8, the exercise device includes two pins, 670 and 672, which are both rectangular. The connector includes two corresponding rectangular pin slots, 676 and 678. Again, the pins fit into the pin slots, to couple the exercise device to the connector.

Figure 9A:
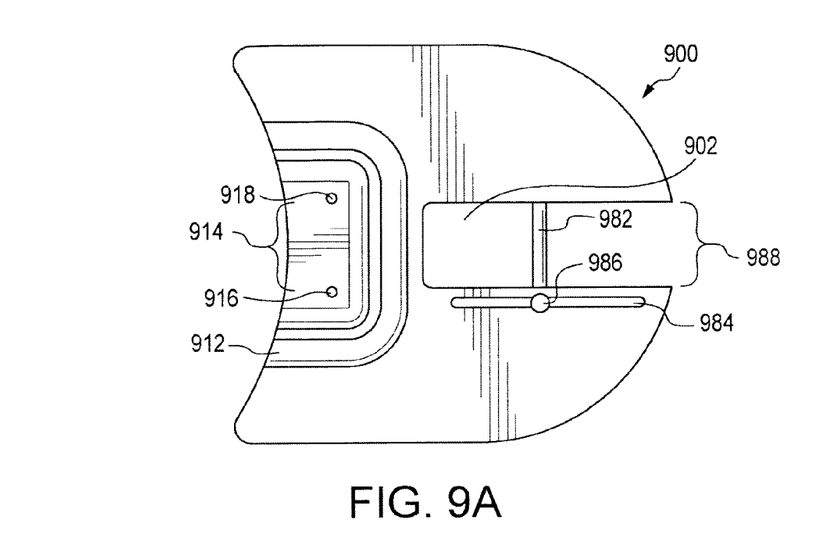
Figure 9B:
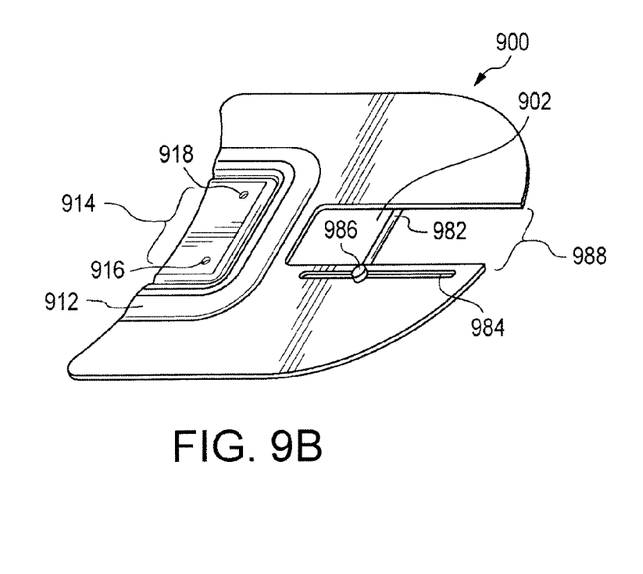

FIGS. 9A and 9B illustrate another connector, 900, for connecting a five-leg chair and an exercise device; FIG. 9A is a top view, and FIG. 9B is a perspective view. The connector includes a single adjustable wheel hole, 902, for coupling a wheel of a five-leg chair to the connector. The wheel hole is adjusted by moving bar, 982, to a desired position along trough, 988. The bar extends across the trough and under a channel, 984. A locking knob, 986, may be used to fix the position of the bar; the locking knob includes screw threads which screw into a corresponding screw hole in the bar by twisting the locking knob. Optionally, the moving bar may be swung underneath the connector, so that the wheel may be rolled into the desired position, and then swung back across the trough, to couple a wheel of a five-leg chair to the connector; this avoids the need for the wheel to roll over an obstruction. When used to couple a five-leg chair and an exercise device, the user is propelled away from the exercise device, and the wheel of the five-leg chair will be held against the bar. Also illustrated is exercise device coupler, 914, for coupling an exercise device to the connector. This exercise device coupler includes two pin slots, 916 and 918, for receiving pins present on an exercise device (not illustrated). Further illustrated is an optional end structural support, 912.

As described above, and illustrated in the figures, the present application includes examples of means for coupling an exercise device to a five-leg chair, such as the connectors illustrated in FIGS. 1-3 and 9; means for coupling a five-leg chair to a connector, such as the wheel holes illustrated in FIGS. 1-3 and 9; and means for coupling an exercise device to a connector, such as the pin slots and hooks illustrated in FIGS. 1-3 and 9.

The connector may also be used in a method for connecting a five-leg chair and an exercise device. In the method, a wheel of a five-leg chair is place into a wheel hole of the connector, coupling the five-leg chair to the connector. An exercise device is coupled to the connector, for example by pins present on the exercise device being placed into pin slots on the connector, or by placing hooks on the connector over a cross bar on the exercise device, or by a weld. This allows the connector to couple the five-leg chair to the exercise device. A user may then proceed to exercise using the exercise device while sitting on the five-leg chair. Preferably, the exercise device is under a desk, so that the user may also carry out office work, such as typing or writing, using a computer, or speaking on a telephone. Preferably, both the exercising and the office work are carried out simultaneously.

What is claimed is:

1. A connector, for coupling an exercise device to a five-leg chair through a single wheel of the five-leg chair, comprising:
    a substantially horizontal plate, contacting the floor when in use, the plate including at least one wheel hole for receiving the single wheel of the five-leg chair,
    and an exercise device coupler fixedly coupling an exercise device to the plate wherein the single wheel of the five-leg chair is the only part of the chair that couples the chair to the connector.

2. The connector of claim 1, wherein the exercise device coupler comprises means for coupling the exercise device to the coupler.

3. The connector of claim 1, comprising a plurality of wheel holes for receiving the single wheel of the five-leg chair, the wheel holes being aligned in a row and being of varying distance from the exercise device.

4. A connector, for coupling an exercise device to a five-leg chair through a single wheel of the five-leg chair, comprising:
    a substantially horizontal plate contacting the floor when in use, the plate having means for coupling the five-leg chair through the single wheel to the connector and to an exercise device coupler, wherein the single wheel of the five-leg chair is the only part of the chair that couples the chair to the connector.

5. The connector of claim 4, wherein the exercise device coupler comprises means for coupling the exercise device to the coupler.

6. The connector of claim 4, wherein the means for coupling the five-leg chair to the connector is one of a plurality of wheel holes, the wheel holes being aligned in a row and being of varying distance from the exercise device.

7. A system for exercising while performing office work, comprising:
    a five-leg chair having wheels,
    an exercise device coupled to the five-leg chair,
    and a connector for coupling the exercise device to a five-leg chair through a single wheel of the five-leg chair,
    comprising a substantially horizontal plate for contacting the floor when in use, the plate having means for coupling the five-leg chair through a single wheel to the connector and to an exercise device coupler, wherein the single wheel of the five-leg chair is the only part of the chair that couples the chair to the connector.

8. A method of coupling a five-leg chair having wheels, and an exercise device, through a single wheel of the five-leg chair, comprising:
    placing the single wheel of the five-leg chair into a wheel hole of a connector,
    the wheel hole being present in a horizontal plane,
    and coupling the exercise device to an exercise device coupler of the connector, wherein the single wheel of the five-leg chair is the only part of the chair that couples the chair to the connector.

* * * * *